Patented May 20, 1941

2,242,230

UNITED STATES PATENT OFFICE 2,242,230

PROCESS OF PRODUCING CONJUGATION IN UNCONJUGATED POLYENES

George O. Burr, Minneapolis, Minn., assignor to Regents of the University of Minnesota, Minneapolis, Minn., a corporation of Minnesota No Drawing. Application June 22, 1938, Serial No. 215,299

13 Claims. (Cl. 260—398)

This invention relates to procedures for converting substances having unconjugated double bonds into substances having conjugated double bonds, and to the new products of such procedures.

There are many widely distributed natural substances such as the oils pressed from linseed, rape, soya bean, poppyseed, peanut or sunflower seed, and fish oils such as cod liver oil, whale oil and the like, which are composed of one or more constituents having what is known as unconjugated double bonds. One of the characteristics of substances having the unconjugated double bond arrangement is that they do not in their natural state as readily form films when exposed to air as do conjugated systems. While some of these oils are classified as "drying oils" or "semi-drying oils," the classification is based upon the fact that by suitable processing they may be converted into such drying or semi-drying materials.

By contrast nature has provided only two well known oils which in their natural state have the conjugated systems, and exhibit the drying effect. These oils are tung oil, which is also known as Chinawood oil, and oiticica oil, the latter being as yet rare and little used. As a consequence, because of the large and growing demand and comparatively small supply, tung oil commands a high market price.

I have discovered a method of converting substances having the unconjugated double bond structure to substances having the conjugated double bond structure which is applicable to natural products such as linseed, corn and cotton seed oil and to the derivatives of or otherwise produced constituents of such natural products in which the unconjugated double bonds occur, and as a result I am able to impart to such cheap and plentiful materials some of the attributes of the more expensive tung oil.

It is therefore an object of the present invention to provide a procedure for converting substances having unconjugated double bonds into substances having conjugated double bonds, and to provide new products of such procedures.

It is a further object of the invention to provide such new procedures for converting substances having unconjugated double bonds into substances having conjugated double bonds, which procedures are characterized by the fact that they are carried out under non-aqueous or substantially non-aqueous conditions, or under conditions such that any water present is removed from the zone of influence of the reaction so that the reaction as for example by suitable choice of solvents or by vaporizing the water while carrying out the reaction in a sealed vessel is not inhibited by the presence of water.

It is a further object of the present invention to provide a process of reacting upon natural or synthetic materials and their derivatives having unconjugated double bonds, which materials do not form films or do so slowly or partially, to produce substances having conjugated double bonds which do form films or do so more rapidly than the starting material, and to provide new products of such procedures.

It is a further object of the invention to provide a process of increasing the spectrographic light absorption in the light ranges of from about 2300 to about 2350 Angstrom units and at about 2700 Angstrom units, of natural and synthetic materials having unconjugated double bonds and materials derived therefrom, and of increasing the "diene number" and of decreasing the "iodine number."

It is a further object of the invention to provide methods of treating and controlling the treatment of natural or synthesized materials having unconjugated double bonds to increase their conjugation, by which methods the degree of increase of conjugation may be regulated and the drying qualities of the finished products derived from the thus treated materials controlled as desired.

It is a further object to provide new and useful procedures for making film-forming compositions from substances such as naturally occurring non-drying oils or naturally occurring oils which dry slowly or partially or the derivatives or reaction products of such oils, which heretofore have not been available ingredients for film-forming compositions or have had to be processed to permit their use, and to provide new and useful film-forming constituents and compositions derived from such materials.

It is also an object to provide new and useful procedures for making paints, lacquers, varnishes, drying waxes and the components of such products, and to provide such new and useful products of such procedures.

It has been shown by Moore (Biochemical Journal 31: 138–154. 1937) that when the fatty acids containing two or more double bonds are operated upon by a solution of potassium hydroxide in ethyl alcohol and water, for a long period of time, there is a slow rise in the spectrographic absorption. This reaction is uncertain in that it is frequently impossible to repeat results, and it is extremely slow, in that it may take weeks to approach completion. For instance, it is reported that after one week of reaction the spectrographic absorption factor of linseed oil fatty acids which is initially 2½ units at 2300 to 2350 Angstrom units and zero at 2700 Angstrom units rose to 360 at 2300 Angstrom units and 293 at 2700 Angstrom units, and at the end of twenty-five days the absorption factors increased to 410 and 230, respectively. Likewise with corn oil fatty acids having very low initial spectrographic absorption factors at 2300 to 2350 and 2700 Angstrom units rose to 110 at 2300 to 2350 and to less than 15 at 2700 units, respectively.

I have discovered that substances containing unconjugated double bonds such as the unconjugated polyenes may be operated upon and that the double bonds thereof may be reoriented into conjugated relationship very quickly when the operation is carried out under non-aqueous or substantially non-aqueous conditions, or under conditions such that if any water is present it is effectively isolated from the media of reaction. When thus carried out it is possible to obtain excellent yields in some instances approaching or even reaching theoretically quantitative yields, even though the operation is carried out for only a relatively few hours. Furthermore, the reaction proceeds smoothly, it can be repeated with unvarying certainty and the reaction can be controlled with accuracy, all with the result that the amount of conjugation can be raised to any desired degree up to the theoretical maximum.

My process is applicable to any of the substances in which unconjugated double bonds are present whether natural products or synthesized materials, as for instance, unconjugated polyene materials such as acids, alcohols, fatty acids, simple or complex esters, glycerides such as are found in natural substances, fats, waxes and the like. In my procedure I subject such substances containing multiple unconjugated double bonds to the action of an inorganic or organic basic reagent, or to the action of an inorganic basic metal or oxide of a basic metal, in a medium which is non-aqueous or substantially non-aqueous or in one which by the choice of suitable ingredients, any water formed is substantially isolated from the reaction media.

I prefer to carry out my procedure in the presence of a non-aqueous solvent capable of carrying the basic reagent uniformly to the material containing the unconjugated double bond which is being operated upon. I have also found that for best results it is desirable to operate under conditions in which as heretofore explained, the quantity of water present is reduced to a minimum, and to carry out the reaction at elevated temperatures in a vessel which has been evacuated or otherwise maintained under non-oxidizing conditions so that the reactive conjugated double bond containing substances which are produced will not be deteriorated and discolored. From the foregoing it will be seen that in general the rate of conjugation increases with an increase in temperature of reaction and I accordingly prefer to carry out the procedure at an elevated temperature. By the term "elevated temperature" as used in the specification and claims, I refer to a temperature above normal room temperature.

The most diverse materials may be operated upon, the criterion being that it should have two or more double bonds in the unconjugated position. Thus I have found that my process is applicable to such lipid substances as the oils of linseed, corn, cotton seed, soya bean, poppyseed, rape, teaseed, sunflower, perilla, peanut and fish oils such as cod liver oil or to fatty acids, esters, simple or complex glycerides, alcohols or waxes derived from these substances, or from the isolated constituents of such natural lipid materials. Thus my process is applicable to linolic, linolenic or arachidonic acids or other acids having two or more unconjugated double bonds, or to the fatty acids of the above oils, such as the mixed fatty acids of linseed oil.

In some instances it is desirable to prepare soaps from the fatty acids prior to carrying out the reaction of the invention. This may be done by any established saponification procedure or in reaction mixture. Likewise, if desired, the esters such as the methyl, ethyl or other alcoholic esters may be prepared prior to carrying out the procedure and these esters used as the starting ingredient, or if desired, the ene-ols, as for instance, linoleyl alcohol may be used.

The basic reagent for my reaction process is preferably an alcoholate of potassium, sodium or lithium, although other inorganic substances having basic properties such as the aluminum bases may also be used in some instances. Such basic alcoholates may be prepared by adding an alcohol such as butyl alcohol to the basic metal such as metallic sodium or metallic potassium, and the basic alcoholate thus prepared is introduced into the material to be reacted upon either with or without the addition of a solvent, or such a reagent may be prepared by dissolving the hydroxide of the metal, such as potassium hydroxide in the organic solvent without the use of water. Thus potassium hydroxide dissolved in butyl alcohol is an excellent reagent.

In order to carry out the reaction procedure most expeditiously it is desirable uniformly to distribute the basic reagent, as for instance, the basic alcoholate throughout the material to be reacted upon, and for this purpose I prefer to carry out the reaction in the presence of a common solvent which is capable of dissolving both the material to be reacted upon and the basic reagent. It is usually convenient to dissolve the material to be reacted upon in an alcohol corresponding to the alcohol used in preparing the basic reagent, when an alcoholate is used for this ingredient, but this is not essential for other common organic solvents may be used. Thus where potassium butylate is used as the basic reagent, butyl alcohol gives good results when used as the solvent, although other alcohols, or other organic media such as the ketones or ethers may be used as the solvent medium if they have the desired solvent action. In some instances the alcohol constituent of the basic reagent is in itself sufficient to serve as the solvent medium where the reaction is carried out at sufficiently elevated temperatures.

Organic bases such as the amines may also be used as the basic reagent although the speed of the reaction with them is usually much less than when using the alkali alcoholates and the yield not as high. Amine bases such as triethylamine and tributylamine give appreciable yields of the conjugated double bond material, particularly at elevated temperatures. Other organic bases such as pyridine or sodamide also produce some of the conjugated double bond material when used as the basic reagent in our reaction.

The yields when using the alkali alcoholates or solutions of alkali hydroxides in alcohols are substantially quantitative and the reactions are usually complete in a few hours, whereas with organic bases much lower ranges of yields are produced, and longer time of reaction is necessary.

The solid basic metals and metallic bases may also be used, as will be pointed out specifically in the examples hereinafter given.

The operating temperatures, conditions of reaction under which my procedure may be carried out, and other details, are illustrated by the following examples of the invention which are intended merely to be illustrative and not as limitations upon the invention.

*Example I*

A quantity of linseed oil fatty acids is first thoroughly mixed with five times its weight of 20 per cent sodium ethylate in ethyl alcohol (the percentage being based upon the quantity of ethyl alcohol present) and then additional ethyl alcohol is added in order to produce a solution. The mixture is then refluxed at atmospheric pressure to increase the conjugation. Where the reaction is carried out in an oil bath the additional ethyl alcohol is unnecessary since the ethyl alcohol present in the 20 per cent ethyl alcohol solution of sodium ethylate serves as a solvent for the fatty acids involved. After six and one-half hours of refluxing a spectrographic analysis of a sample shows an absorption factor of 123 at 2350 Angstrom units, thus indicating the presence of conjugated dienes and trienes in the material. The spectrographic analysis in this instance and in those hereinafter given is made with a sample one per cent solution, one centimeter in thickness, and the anaylsis is carried out according to established procedures.

I have discovered that spectrographic analyses in the light ranges of from about 2300 to about 2350 Angstrom units and at about 2700 Angstrom units is an accurate means of gauging conjugation, in many cases more accurate than such accepted procedures as (1) the Kaufman "diene number" procedure or (2) the Hanus "iodine number," and the increase in the above absorption factors thus indicates an increase in double bond conjugations and the effects attributed to double bond conjugation such as the drying or film-forming ability of the derivative products.

After twenty-four hours of boiling the absorption factors in the above material increase to 296 at 2350 Angstrom units and to 277 at 2700 Angstrom units, thus indicating a decided increase in the conjugated double bond structures produced by my procedure.

*Example II*

A sample of linseed oil fatty acid prepared according to any usual procedure, such as a one minute saponification treatment with potassium hydroxide followed by acidification and washing to remove impurities and an extraction to isolate the pure dry fatty acid mixture, is dissolved in four times its weight of 20 per cent sodium butylate in butyl alcohol, and additional butyl alcohol added to complete the solution. The mixture is then refluxed at atmospheric pressure. After two hours of refluxing a spectrographic analysis of a sample shows an absorption factor of 232 at 2350 Angstrom units, and an absorption factor of 241 at 2700 Angstrom units. After an additional two hours of refluxing a spectrographic analysis shows an absorption factor of 300 at 2350 Angstrom units. The refluxing when continued for an additional seventeen hours raises the absorption factors to 370 at 2350 Angstrom units and 292 at 2700 Angstrom units. By comparison it may be noted that the absorption factor of tung oil is about 1200 at 2700 Angstrom units. The relatively high total of the absorption factors of the thus treated linseed oil fatty acids indicates the presence of relatively large percentages of the conjugated double bond constituents. Such materials yield suitable film-forming products when appropriately treated, as will hereinafter be explained.

*Example III*

As a check procedure against the use of the absorption spectra method of determining the presence of the conjugated double bond structure linolic acid may be refluxed under a Bunsen valve at 124 degrees C. with four times its weight of 20 per cent sodium butylate in butyl alcohol and the reaction vessel opened at intervals for the withdrawal of samples. Each sample should then be spectrographically analyzed at 2300 to 2350 Angstrom units and also subjected to the "diene value" determination according to the Kaufman method, using a maleic anhydride reagent according to the standard method of determining conjugation. The results of such a procedure are as follows:

| Time in minutes | Absorption at 2300 to 2350 Angstrom units | Diene value Kaufman method |
| --- | --- | --- |
| 0 | 14.0 | 3.6 |
| 30 | 65.5 | 9.2 |
| 60 | 128.0 | 8.4 |
| 90 | 185.0 | 13.5 |
| 120 | 235.0 | 15.0 |
| 150 | 245 | 15.1 |
| 180 | 268 | |
| 240 | 305 | 23.1 |
| 900 | 373 | 31 |

These values demonstrate the rapid production of conjugation according to my method and also establish the reliability of spectrographic analysis as a means of determining the conjugation. The degree of conjugation produced in accordance with my method may be controlled by interrupting the heating, and in this manner the drying time, film hardness and other qualities of the product ultimately produced may be regulated as desired. This feature of the procedure is applicable in any of the examples given herein.

*Example IV*

In the previous example linolic acid which has two unconjugated double bonds was used as the starting ingredient. Linolenic acid, which has three unconjugated double bonds may also be used. In carrying out the procedure with linolenic acid one gram of metallic sodium is dissolved in 50 grams of anhydrous butyl alcohol and to this is added 3 cc. of pure distilled linolenic acid. The mixture is then refluxed under a constant stream of nitrogen so as to prevent oxidation and samples are withdrawn at intervals and the butyl alcohol removed by steam distillation. The fatty acids are then isolated and spectrographically analyzed at 2350 and 2700 Angstrom units. The results of such a procedure show an increase of conjugated double bonds in the material as follows:

| Time in minutes | Absorption factor at 2350 Angstrom units | Absorption factor at 2700 Angstrom units |
| --- | --- | --- |
| 15 | 40 | 6.4 |
| 30 | 77.5 | 17 |
| 45 | 121 | 33.6 |
| 60 | 141 | 50.5 |
| 120 | 218 | 255 |
| 180 | 342 | 286 |
| 600 | 557 | 457 |

This procedure thus demonstrates that conjugation may also be produced in substances having three unconjugated double bonds and also shows that conjugation may be produced in increasing amounts. The "diene values" (presence of conjugation) when determined in accordance with the Kaufman method on each of the samples in this example serve as a check upon the accuracy of the spectrographic absorption analysis. The "diene value" at the completion of the reaction was 67.8. It is noted here that the absorption at from about 2300 to about 2350 Angstrom units indicates the double bond conjugation as produced in compounds of the linolic acid type, whereas the absorption at about 2700 Angstrom units indicates conjugation of the kind produced in compounds of the linolenic acid type, naturally present in the eleostearic acid of tung oil, in which three double bonds are found in conjugated form.

*Example V*

Arachidonic acid is another example of an acid in which unconjugated double bonds are present and which may be treated in accordance with the present procedure. A portion of this acid is diluted respectively with a basic reagent which may be either alcoholic KOH or dilute sodium ethylate, and is then refluxed under a constant flow of nitrogen. Conjugation is produced after a relatively short period of refluxing as may be shown by suitable analysis. As a check procedure oleic acid which contains only one double bond remained completely unchanged after the same treatment with these reagents, thus demonstrating that where two or more unconjugated double bonds exist in the compound conjugation will be produced by my procedure, whereas where only one double bond is present, as is the case with oleic acid, conjugation is not produced.

*Example VI*

In the above examples it has been shown that the conjugated structure may be produced in fatty acids and various other acids, after a treatment with alkali metal alcoholates, depending upon the amount of unconjugated double bond material present. In the present example the effectiveness of this procedure is further demonstrated.

Six and eight-tenths grams of metallic sodium are first dissolved in 100 cc. of freshly distilled ethyl alcohol to produce a 20 per cent solution of sodium ethylate in ethyl alcohol. Five cc. portions of the 20 per cent sodium ethylate solution are then added to 1 cc. each of the substances listed below and an additional five cc. portion of ethyl alcohol added to each aliquot portion as a solvent. The samples should then be sealed in glass tubes after partial evacuation so as to prevent oxidation and heated for 109 hours at 98° C. As a result of this procedure conjugation is produced in those substances in which unconjugated double bonds originally were present, as indicated by the following absorption tests:

| Substance treated | Absorption at 2350 Angstrom units | Absorption at 2700 Angstrom units | Reputed linoleic acid percent content |
| --- | --- | --- | --- |
| Linolic acid | 462.5 | 4.1 | 100 |
| Corn oil | 366 | 8.2 | 50 |
| Cottonseed oil | 308 | 3.2 | 40 |
| Peanut oil | 231 | 2.4 | 24 |
| Poppyseed oil | 426 | 20.5 | 58 |
| Sunflower seed oil | 328 | 3.1 | 57 |
| Butter | 29.2 | 7 | 3 |
| Hydrogenated cottonseed oil. Sample #1 | 35.5 | 1.1 | 7 |
| Hydrogenated cottonseed oil. Sample #2 | 83.15 | 2.7 | 11 |
| Lard | 57.3 | 55.5 | 10 |

In the first six substances treated in accordance with this example large increases in conjugation were produced as indicated by the large absorption factor at 2350 Angstrom units, whereas with butter, the hydrogenated cotton seed oils and lard, relatively small absorption factors are noted at 2350 Angstrom units. This is believed to be due to the low content of linoleic acid in these latter substances.

*Example VII*

The relation between the rated linolic acid and linolenic acid value or higher unsaturated fatty acid content of the various oils to the production of conjugation as shown by the preceding example, is further demonstrated by the following procedures.

In carrying out this procedure fatty acids of various oils as tabulated in this example are admixed with four times their volume of a solution of sodium butylate in butyl alcohol which may be prepared by dissolving 6 grams of metallic sodium in 100 cc. of butyl alcohol. Each of the samples except cod liver oil should be treated with twenty per cent sodium butylate reagent. The cod liver oil is preferably treated with a five per cent sodium butylate solution rather than more concentrated solution because of the greater reactivity of cod liver oil as compared with, for instance, corn or cotton seed oil. The addition of sodium butylate solution to the fatty acid immediately produces the corresponding soaps in each sample and each is then diluted with two volumes of additional butyl alcohol so as to produce solution. The samples are then enclosed in tubes and sealed after partial evacuation and heated for seven hours at 150° C. Since the tubes are sealed, the pressure generated within them permits the use of higher operating temperatures which causes the reaction to proceed rapidly. At the end of the reaction period the butyl alcohol is driven off by heating at 100° C. under vacuum and the treated fatty acids are isolated. Spectrographic analysis at about 2350 and about 2700 Angstrom units, "diene value" determinations in accordance with the Kaufman method and the "iodine number" determinations in accordance with the Hanus method are then made. The results of such procedure show the production of conjugation in each of the materials as indicated by the three tests for conjugation, as follows:

| Material treated | Absorption factor at about 2350 Angstrom units | Absorption factor at about 2700 Angstrom units | Diene No. Kaufman method | Iodine No. Hanus method | Original iodine No. |
|---|---|---|---|---|---|
| Corn | 386 | 39.4 | 13.3 | 111.5 | 127.5 |
| Cottonseed | 304 | 15.7 | 11.0 | 98.6 | 111.3 |
| Peanut | 243 | 14.6 | 7.6 | 100.0 | |
| Soyabean | 447 | 44.7 | 10.8 | 119.5 | |
| Linseed | 583 | 302 | 18.8 | 148.5 | 180.0 |
| Cod liver | 210 | 218 | 7.7 | 149.0 | |

This example demonstrates that by the use of our procedure conjugation may be produced and that the "iodine number" may be reduced from the high value corresponding to the raw material to the value corresponding to that of conjugated double bond containing compounds which are known to have abnormally low "iodine values."

Example VIII

The reaction of the present method may also be carried out with alkaline reacting salts although the increase in conjugation produced by this procedure is not as large as that produced by the procedures outlined in the preceding examples wherein the yields were approximately quantitative. As an example of the procedure using alkaline salts, linseed oil fatty acids should be dissolved in anhydrous butyl alcohol and treated with an excess of each of the dry salts given below, the amount of salt being based upon the theoretical quantity of fatty acid present. In each case the linseed oil acid, alcohol, salt mixture should be sealed in a glass tube after partial evacuation and heated for thirty-six hours at 175° C.

| Salt used with the linseed oil fatty acid | Absorption factor at about 2350 Angstrom units | Absorption factor at about 2700 Angstrom units |
|---|---|---|
| Anhydrous potassium acetate | 13.8 | 17.5 |
| Trisodium phosphate | 5.1 | 1.7 |
| Potassium acid phosphate | 5.5 | 1.8 |
| Anhydrous borax | 4.7 | 1.7 |
| Sodium benzoate | 16.5 | 2.0 |
| Potassium thiocyanate | 9.3 | 1.2 |
| Borax in glycerol | 5.5 | 2.4 |

Example IX

The rate at which the conversion of the unconjugated structure to the conjugated structure takes place, or the velocity of the reaction, is proportional to the amount of the basic reagent present. When less than the stochiometric equivalent quantity of basic reagent is used, based upon the amount of fatty acid present or developed in the solution, no appreciable reaction is produced. This is demonstrated by the following procedure: 2.00 grams of metallic sodium are dissolved in 100 cc. of butyl alcohol and varying quantities of this basic reagent solution are then added to samples of linolic acid, together with additional butyl alcohol, to complete the solution. Each of the sample solutions should be sealed in glass after partial evacuation and heated for three hours at 120° C. The results of this procedure are as follows:

| Sample | Quantity of linolic acid | Quantity of basic reagent (sodium butylate) | Quantity of butyl alcohol | Absorption factor at 2300 Angstrom units |
|---|---|---|---|---|
| | Cubic centimeters | Cubic centimeters | Cubic centimeters | Cubic centimeters |
| 1st | .5 | 0 | 10 | 17.5 |
| 2d | .5 | 1 | 9 | 16.2 |
| 3d | .5 | 3 | 7 | 5.3 |
| 4th | .5 | 5 | 5 | 108.5 |
| 5th | .5 | 10 | 0 | 216.0 |

While I have not finally determined the mechanics of the reaction, it is believed that the basic reagent does not act as a mere catalyst but enters into the reaction and that the speed of the reaction is proportional to the excess of the basic reagent which is present over the stochiometric equivalent. However, I do not intend that this proposed theory should be regarded in any way as a limitation upon my invention.

Example X

While many of the preceding examples involve the use of ethyl or butyl alcohol with sodium, other alcohols and other basic metals and alkalies operate with equal satisfaction. Thus potassium, lithium or other basic metals or their hydroxides, and other alcohols may be used, the rate of the reaction being governed by the basic reagent and by the boiling point of the alcohols if the conversion is carried out under reflux. If, however, the reaction is carried out with the corresponding soaps dissolved in the various alcohols and is carried out in a sealed vessel in which elevated temperatures and pressures may be developed, as is the case in many of the preceding examples, the nature of the alcohol becomes immaterial beyond its ability to dissolve a sufficient quantity of the basic reagent, such as the alkali alcoholate.

As examples of the secondary and tertiary alcohols whose usefulness is limited only by their ability to dissolve sufficient quantities of the corresponding sodium alcoholates the following is given: Approximately 10 per cent and five per cent suspensions of sodium isopropylate and sodium tertiary butylate, respectively, may be mixed with whole linseed oil and heated in sealed tubes for twenty-four hours at 110° C. At the end of the heating period the linseed oil which is reacted upon by the sodium isopropylate shows an absorption factor of 400 at 2350 Angstrom units and a factor of 390 at 2700 Angstrom units The linseed oil sample which is reacted upon by the sodium tertiary butylate shows an absorption factor of 195 at 2350 Angstrom units and a factor of 128 at 2700 Angstrom units. The lesser absorption factor in the case of the sodium tertiary butylate is due to the low concentration (five per cent) of the alcoholate used.

Polyhydric alcohols, of which glycol is an example, may also be used, as shown in Example XI hereinafter given.

In the above examples it has been shown that the present procedure may be carried out by the use of alkali metal alcoholates but solutions of the alkali hydroxides in alcohols may also be used, as in one part of Example V. Thus ten grams of potassium hydroxide dissolved in 50 grams each of dry ethyl and butyl alcohols may be used. Samples of linseed oil fatty acids may be mixed with either of the alcoholic solutions of potassium hydroxide in the proportion of one part of the fatty acids to four parts of the alcoholic alkali hydroxide solution. The potassium soaps of the linseed oil fatty acids which are formed are sealed in glass tubes with the alcohol-KOH solution and heated for several hours at 150° C. Spectrographic analysis of the thus treated material indicates that they contain substances having the conjugated double bond, the absorption values being 515 at 2350 Angstrom units and 270 at 2700 Angstrom units. Other alkali hydroxides serve as well in carrying out the invention, thus sodium hydroxide may be used, but the reaction is slower due to its very limited and difficult solubility in alcohols.

Example XI

It is not necessary that the material being reacted upon be a fatty acid but various whole oils or fats may be used directly, as indicated in Examples VI and VII. As a further example of this procedure, one mol of linseed oil and four mols of potassium hydroxide are dissolved in an excess of glycol. The soap thus produced is refluxed for several hours and the fatty acids isolated. The glycol being very soluble in water is easily removed in the isolation procedure. Because of the high boiling point of glycol the refluxing of the mixture takes place at 195° C. and as a result the reaction is very quickly completed. Spectrographic analysis of the resultant product shows an absorption of 410 at 2350 Angstrom units and 210 at 2700 Angstrom units, thus indicating large quantities of the conjugated double bond components.

As a further example of the use of a natural oil as the starting ingredient one mol of soya bean oil may be refluxed for five and one-half hours with four mols of potassium hydroxide in isoamyl alcohol. The boiling point in this instance is 130° C. The resultant product is then subjected to a vacuum distillation so as to remove the isoamyl alcohol. The resultant product will be found to contain the conjugated ingredients as indicated by an absorption factor of 373 at 2350 Angstrom units and 70.5 at 2700 Angstrom units.

As a further example of the treatment of a natural lipid material, samples of linseed oil may be treated with an excess of potassium hydroxide dissolved in one case with methyl alcohol and in another case with ethyl alcohol. The thus produced fatty acids are then sealed in glass tubes and heated at 110° for twenty-four hours, and when isolated indicate a high content of conjugated double bond ingredients, the absorption being 515 at 2350 Angstrom units.

Poppyseed oil may likewise be reacted in accordance with this procedure by treating with the alkaline reagent, potassium hydroxide dissolved in dry butyl alcohol. The reaction is preferably carried out in a vessel which has been sealed under vacuo, in order to protect the resultant products from oxidation and to permit higher temperatures which speed the reaction. A reaction temperature of 110° C. when maintained for twenty-one hours produces an excellent increase in conjugation. If desired sodium butylate in excess in four volumes of butyl alcohol may be used as the alkaline reagent with each volume of poppyseed oil in place of potassium hydroxide in dry butyl alcohol.

Example XII

The use of the foregoing methods for producing conjugation in substances in which the double bonds are originally in the unconjugated positions involves the ultimate saponification of the oil or fat used as the starting ingredient, and the resultant fatty acid in which the double bonds are in the conjugated condition may be resynthesized to the corresponding esters of monohydric and polyhydric alcohols such as linoleyl alcohol, glycerol or glycol for the production of useful film-forming materials. Thus the fatty acids of linseed and soya bean oil after having been subjected to any of the procedures outlined above may be converted to the glycerides by heating mixtures of ten equivalents of the fatty acid and nine equivalents of glycerine at from 150 to 170° C. for from four to six hours, and thereafter maintaining the temperature at from 210 to 225° C. for six hours or longer while the mixture is shaken in an appropriate vessel attached to a source of partial vacuum for the removal of generated vapors. The resulting glycerides have a light color, in some instances even lighter than the corresponding natural oils. Thus the glycerides prepared from soya bean and linseed oils which have been treated in accordance with my procedure are water white and dry rapidly to give a water white film on glass. The films are tenacious, relatively hard, free from wrinkles, and so clear that it is difficult to distinguish them from the glass on which they are applied.

For purposes of comparing the drying speed which may be achieved by the use of my process linseed oil may be saponified by treatment for one minute with potassium hydroxide and then washed to free it from impurities and to isolate the pure dry fatty acid mixture. One-half of the fatty acid mixture is then treated with sodium butylate for five hours to increase the conjugation as in the foregoing procedures, while the other half is permitted to remain untreated. Both samples are then resynthesized to the corresponding glycerides by heating with glycerine, the fatty acids being in excess of the stoichiometric equivalent quantity of glycerine necessary to produce the triglyceride.

The glycerides resulting from the fatty acids which had not been treated in accordance with my procedure had a drying time of four days and produced a film on glass which was almost water white. The glycerides made from fatty acids treated in accordance with my procedure to increase conjugation had a drying time of about two days and produced a film on glass which was water white, perfectly clear, tenacious, relatively hard and free from wrinkles. For purposes of comparison tung oil of usual commercial quality produced under like conditions and on glass, a hard opaque, mottled white film.

A similar parallel procedure was run using soya bean oil as the initial ingredient, one-half of the resultant soya bean fatty acids mixture being treated to increase the conjugation and the other half untreated. The untreated fatty acid when resynthesized to the corresponding glycerides produced a substance which did not dry after seven days when applied as a film on glass, whereas the glycerides prepared from soya bean fatty acids treated in accordance with my procedure in two days dried to a hard, water white film when applied to glass.

The glycerides produced from material which is treated in accordance with any of the examples herein may be formed into paints, lacquers, resins, varnishes and the like by suitable additions. Thus by the addition of pigments, fillers, modifiers, softeners, plasticizers, thinners and the like, I may produce lacquers or paints, or by merely using thinners and modifying resins, waxes and oils I may produce a lacquer or varnish.

Example XIII

As an example of the use of organic bases, particularly the amines, one part of linseed oil may be admixed with two parts of absolute ethyl alcohol in which an excess of triethylamine is present and the mixture sealed under vacuum and heated for 22 hours at 110° C. This treatment resulted in an appreciable increase of the conjugated constituent as indicated by the standard "diene test" for conjugation and also by spectrographic analysis.

Likewise the fatty acids from linseed oil when admixed with two volumes of absolute alcohol having an excess of triethylamine yields an appreciable increase of the conjugated double bond constituents after heating in a sealed tube at 110° C. for 22 hours.

The fatty acids from linseed oil likewise yield an increase in the conjugated double bond constituents when heated at 110° C. in a sealed tube for 22 hours with two volumes of dry butyl alcohol having an excess of tributylamine.

By increasing the temperature, increased amounts of the conjugated double bond constituents may be obtained when using the amines as the basic reagent. Thus when linseed oil admixed with two volumes of dry butyl alcohol having an excess of tributylamine is sealed in a vacuum and heated for 22 hours at a temperature which is gradually increased from 140° C. to 175° C., the amount of conjugated double bond constituents which result are greater than that resulting from the corresponding treatment at 110° C. Likewise when poppyseed oil is heated with an excess of tributylamine in a sealed tube at 250° C. for twenty hours a good increase of the conjugated double bond constituents results.

The treatment using the amines as the basic reagent is likewise applicable to the esters of the fatty acids. Thus methyl esters of fatty acids from linseed oil in an excess of tributylamine when sealed under vacuum and heated for twenty hours at 250° C. yields a good increase of the conjugated double bond constituents.

Example XIV

In some instances it is possible to dispense with the solvent carrier such as the excess of alcohol used in certain of the preceding examples. Thus linseed oil when mixed with an excess of solid sodium ethylate and heated quickly to 180° in an oil bath yields a moderate increase in the conjugated double bond constituents. Similarly linseed oil may be heated with an excess of dry powdery sodium methylate in a tube which has previously been sealed under vacuum. When the heating is carried on at 110° C. for twenty-seven hours a reaction occurs locally around the solid particles and yields a moderate increase in the conjugated double bond constituents.

Similarly, linseed oil may be heated with an excess of solid sodamide in a tube in which the ingredients are sealed under vacuum. When heated at 110° C. for twenty-four hours a good increase of the conjugated double bond constituent occurs. The use of solid metallic sodium yields a moderate increase of the conjugated double bond constituents as does also solid potassium hydroxide pellets. Likewise solid aluminum ethylate produces a slight increase of the conjugated double bond constituents when heated at 110° C. for twenty-four hours.

Example XV

As an example of the manner in which the process may be carried out on fish oils, the following procedure is given: Cod liver oil and an excess of sodium methylate which has been dissolved in methyl alcohol to obtain a five per cent solution is sealed under vacuum and then heated to 110° C. for five hours. A very large increase in the conjugated double bond constituents is observed.

Example XVI

Long chain fatty acids which have been treated in accordance with any of the foregoing procedures to produce conjugated double bond constituents may be reacted with alcohols or alcohols containing conjugated double bonds made in accordance with the foregoing processes may be reacted with organic acids, and as a result there is produced quick drying esters which have an especial utility as the basic material of quick drying waxes.

The acid and alcohol are merely heated together with a suitable catalyst such as a small quantity of sulfuric acid or gaseous hydrochloric acid, until the reaction is completed. The ester, or wax, is then washed with an appropriate solvent to remove the excess acid or alcohol, depending upon which was originally used in excess, and isolated in the usual manner.

The presence of water in the reaction mixtures of my invention diminishes the velocity of the reaction for the production of the conjugated double bond structure. Thus when 3½ grams of potassium hydroxide, 25 grams of ethyl alcohol, 2½ grams water and 5 cc. of linseed oil are refluxed for five hours the spectrographic absorption at 2350 Angstrom units is 30.6 and at 2700 Angstrom units 7½. However, if higher temperatures than the boiling points of the lower alcohols are employed the effect of the water in diminishing the velocity of the reaction is minimized and this is particularly true in the case of butyl alcohol and its higher homologues in which the solubility of water is sufficiently limited that it is effectively isolated from the zone of influence of the reaction and its reaction inhibiting effect is correspondingly diminished. The water which apparently may be produced by the reaction between the alkali hydroxides and any alcohols which may be present apparently is insufficient to effect the reaction.

Throughout the specification and claims, where the term "unconjugated polyene compound" is used it is intended to mean compounds of natural or synthetic origin in which there is a long carbon chain having two or more double bonds in the unconjugated relationship, illustrative materials being natural oils of linseed, cottonseed, corn, rape, soya bean, poppyseed, peanut, sunflower seed, teaseed, perilla seed, fish oil, such as the oils of cod liver or whale oil, or the fatty acids, esters, simple or complex glycerides and waxes or soaps derived from these natural oils, or the isolated constituents thereof such as linolic, linoleic and arachedonic acids, or the isolated ene-ols such as linolyl alcohol, all of which have the common characteristic that they include the long carbon chain having two or more double bonds in the unconjugated relationship.

By the terms "excess" of a basic reagent and "in excess of" or "more than a stoichiometric equivalent amount" I mean a quantity of basic reagent which is in excess of the molar equivalent quantity of basic reagent corresponding to the amount of unconjugated polyene present. In other words, as clearly shown in Example IX, the present invention contemplates the utilization of the basic reagent in such proportion that it be present in a greater amount than the corresponding molar quantity based on the quantity of the polyene. In other words, for each molecule or molar quantity of polyene the present invention contemplates the presence during reaction, of a molecule or molar quantity of alkali and in addition to this an appreciable excess.

It is evident that many modifications may be made in the foregoing procedures by utilizing various analogous material or by utilizing obvious variations in the stated procedures without departing from the spirit of the invention heretofore described and claimed as follows:

1. A process for producing conjugation in unconjugated fatty polyene compounds which comprises treating the unconjugated polyene compound in the substantial absence of water and at an elevated temperature with an excess of a basic reagent.

2. A process for producing conjugation in unconjugated polyene compounds which comprises treating an unconjugated fatty polyene compound in the substantial absence of water and at an elevated temperature with an excess of an alkali alcoholate.

3. A process for producing conjugation in unconjugated polyene compounds which comprises subjecting a mixture of an unconjugated polyene comprising a fatty acid compound and a basic reagent in the substantial absence of water to an elevated temperature, the basic reagent present being in excess of the stoichiometric proportion based upon the quantity of fatty acid occurring in the mixture.

4. A process for producing conjugation in unconjugated polyene compounds which comprises subjecting a mixture of an unconjugated polyene comprising a fatty acid compound, a basic reagent and a non-aqueous solvent, in the substantial absence of water, to an elevated temperature, the basic reagent present being in excess of the stoichiometric proportion based upon the quantity of fatty acid occurring in the mixture.

5. A process for producing conjugation in unconjugated fatty acid compounds which comprises subjecting a mixture of an unconjugated fatty acid compound and a basic reagent, in the substantial absence of water, to an elevated temperature, the basic reagent being present in excess of the stoichiometric equivalent of fatty acids occurring in the mixture.

6. The process of preparing a film forming material from fatty polyene compounds having two or more unconjugated double bonds, which comprises treating such unconjugated polyene compound in the presence of a non-aqueous solvent and in the substantial absence of water and at an elevated temperature with an excess of a basic reagent, and reacting the thus formed product with glycerin at an elevated temperature.

7. The process of preparing a film forming material from fatty polyene compounds having two or more unconjugated double bonds which comprises treating such unconjugated polyene compounds in the presence of a non-aqueous solvent and in the substantial absence of water and at an elevated temperature with an excess of basic alcoholate and reacting the thus formed product with glycerin at an elevated temperature.

8. A process for converting natural relatively non-drying fatty oils having two or more unconjugated double bonds into relatively rapidly drying oils by producing conjugation of the unconjugated polyenes, which comprises subjecting such a natural relatively non-drying oil and a basic alcoholate in the substantial absence of water to an elevated temperature, the basic alcoholate being present in excess of the stoichiometric equivalent of fatty acids occurring in the mixture, and heating the thus formed product with glycerin.

9. A process for converting natural relatively non-drying fatty oils having two or more unconjugated double bonds into relatively rapidly drying oils by producing conjugation of the unconjugated polyenes, which comprises subjecting such a natural relatively non-drying oil and an alkali alcoholate, in the substantial absence of water, to an elevated temperature, the alkali alcoholate being present in excess of the stoichiometric equivalent of fatty acids occurring in the mixture, and heating the thus formed product with glycerin.

10. A process for preparing quick drying wax which comprises under substantially non-aqueous conditions treating an unconjugated polyene long chain alcohol at an elevated temperature with more than a stoichiometric equivalent amount of a basic reagent until conjugation is produced therein and thereafter reacting the thus treated long chain alcohol with an organic acid.

11. A process for preparing quick drying material which comprises under substantially non-aqueous conditions treating an unconjugated polyene long chain organic acid at an elevated temperature with more than a stoichiometric equivalent amount of a basic reagent until conjugation is produced therein, and thereafter reacting the thus treated organic acid and a polyhydric alcohol.

12. A process for preparing quick drying wax which comprises under substantially non-aqueous conditions separately treating unconjugated polyene long chain organic acid and unconjugated polyene long chain polyhydric alcohol at an elevated temperature with more than a stoichiometric equivalent amount of an alkali alcoholate until conjugation is produced in each, and thereafter reacting the thus treated polyene alcohol and polyene acid.

13. A process for preparing a quick drying surfacing composition from an organic acid material and an organic alcohol material both of which have a long chain carbon linkage structure and at least one of which includes unconjugated double bonds which comprises heating the material having such unconjugated double bond structure with an excess of basic reagent under substantially non-aqueous conditions, and then heating the thus produced product with the other material.

GEORGE O. BURR.